May 1, 1928.

G. W. FERDON

FRUIT CORER

Filed April 9, 1927

1,668,198

Inventor
Guy W. Ferdon
By his Attorney S. J. Cox.

Patented May 1, 1928.

1,668,198

UNITED STATES PATENT OFFICE.

GUY W. FERDON, OF CRESSKILL, NEW JERSEY.

FRUIT CORER.

Application filed April 9, 1927. Serial No. 182,203.

The improvements relate to fruit corers and more particularly to corers for grape fruit and similar fruits which are usually cut in halves before being cored, but it may be used for other purposes.

Their object, among others, is to provide a tool of this character which will be of extremely simple and durable construction, may be easily and effectively used, cleaned and cared for and will do away with the objectionable results attending the use of other instruments for the purpose.

The improvements are illustrated in the accompanying drawings, in which—

The tool consists essentially of a deep bowl A to one side of which on its exterior is secured a handle, made of a flat metal strip composed of the upwardly and inwardly curved portion B, the straight angular portion C and the downwardly turned upper end D. The sides of the bowl are approximately straight, and merge in the rounded bottom, while the cutting edge A' is preferably beveled outwardly, although this is not essential. In use for grape fruit, the fruit is first cut in halves, and the bowl of the corer pressed down on the core portion thereof and rotated to a greater or less extent so that its cutting edge will sever the core portion from the remainder of the fruit as the bowl sinks therein, the bowl completely enclosing this severed core. When the core has been severed to a sufficient depth from the remainder of the fruit lying laterally thereof, the bowl is then tilted or canted, and may be rotated while in this position so as to sever the core from the bottom portion of the fruit. In both operations the tool may be held stationary and the fruit rotated.

These operations completely sever the core, and leave it enclosed and held in the bowl or cup so that it can be removed, leaving a smooth central hole extending only to the bottom of the core, and without removing the edible portion below it, by simply lifting the bowl. The shape of the bowl is such that the core, with the tough fibre webs in it and the pits are compressed as the tool is pressed down into the fruit, and will therefore be packed inside the bowl and will remain therein until shaken out. This compression also squeezes the juice out of the core and leaves it in the edible portion of the fruit. A certain degree of suction is also created in the operation of pressing the cutting cup down into the fruit, which causes the core to remain in the bowl. The downwardly turned part of the handle D and the angle between it and the upright portion C give a good purchase for the fingers, and the palm of the hand can be pressed against the top of this angle to give all the pressure required. The peculiar shape of the handle composed of the parts B, C and D also, when pressure is applied at the top, prevents the tool from tilting sidewise, so that in the first part of the operation it will cut down through the middle of the fruit and sever the core to a uniform depth.

Figure 1:
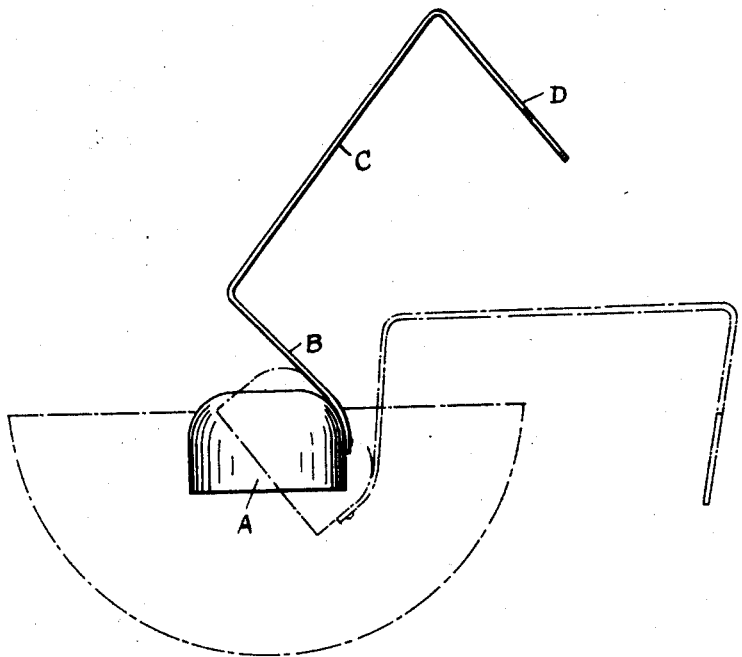
Fig. 1 is a side elevation of a coring tool embodying the improvements with dotted lines indicating a half grape fruit to which it is being applied.
Figure 2:
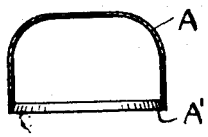
Fig. 2 is a vertical medial section of the bowl with cutting edge.

In the second part of the coring operation the tool is tilted to the position shown in Fig. 1 by the dotted lines, or to some position approximating it, so that it will sever the bottom of the core. This can easily be done in such a manner that the upper part of the core pulls out of the cup. In this position, assuming that the fruit is placed on a flat surface, as usual, the extremity of the handle D will act as a stop and gauge to prevent the tilting of the cup too far, and the upward angular arrangement of the portions B, C permit the handle to extend up over the edge of the fruit while the cup is down in the interior.

With this device the core, with the pits may be quickly and easily removed, without any dripping or spilling of the juice or seeds, and a clean round hole made of depth only sufficient to remove the core, and without getting to the bottom of the piece of fruit, so that none of the juice and edible portions thereof are wasted and nothing is contaminated by the juice. It also completely encloses the core and pits so that they can be carried to a receptacle and deposited therein without being handled. Another advantage resides in the fact that the tool requires the use of only one hand to minipulate it, leaving the other hand free to hold the fruit or rotate it. The cutting edges of the cup may by sharpened by an ordinary steel or other knife sharpener or with a knife or other suitable sharpening or abrasive instrument.

I claim:

1. In a device of the character described a cup shaped cutting instrument with sharpened edges, and a curved handle secured to the exterior thereof at one side and extending upwardly and inwardly therefrom to a position approximately central over the closed end of the bowl and then outwardly and downwardly.

2. In a device of the character described a cup shaped cutting instrument with sharpened edges, and a curved handle secured to the exterior thereof at one side and extending upwardly and inwardly therefrom to a position approximately central over the closed end of the bowl and then outwardly and downwardly, the construction and arrangement of the parts being such that the cup may be pressed down around the core and rotated to sever the core from the portions of the fruit laterally thereof on all sides and then turned and rotated to sever the bottom of the core from the bottom portion of the piece of fruit, and the said core removed with the cup.

Witness my hand this 29th day of March, 1927, at the city of New York, in the county of New York, State of New York.

GUY W. FERDON.